United States Patent
Uetabira

(10) Patent No.: US 11,488,388 B2
(45) Date of Patent: Nov. 1, 2022

(54) CONGESTION CONFIRMATION SYSTEM WITH LOCATION INFORMATION OF EACH USER

(71) Applicant: INTERMAN Corporation, Kagoshima (JP)

(72) Inventor: Shigeki Uetabira, Kagoshima (JP)

(73) Assignee: INTERMAN CORPORATION, Kagoshima (JP)

(*) Notice: Subject to any disclaimer, the term of this patent is extended or adjusted under 35 U.S.C. 154(b) by 0 days.

(21) Appl. No.: 17/208,184

(22) Filed: Mar. 22, 2021

(65) Prior Publication Data

US 2021/0303869 A1   Sep. 30, 2021

(30) Foreign Application Priority Data

Mar. 29, 2020 (JP) .............................. JP2020-059239

(51) Int. Cl.
*G06V 20/52* (2022.01)
*H04W 4/021* (2018.01)
(Continued)

(52) U.S. Cl.
CPC .............. *G06V 20/53* (2022.01); *G06V 20/38* (2022.01); *H04W 4/021* (2013.01); *H04W 4/029* (2018.02)

(58) Field of Classification Search
CPC ....... G06V 20/38; G06V 20/53; H04W 4/021; H04W 4/025; H04W 4/029
See application file for complete search history.

(56) References Cited

U.S. PATENT DOCUMENTS

| | | | |
|---|---|---|---|
| 2010/0080163 A1* | 4/2010 | Krishnamoorthi | .... H04L 12/189 340/568.1 |
| 2013/0088494 A1* | 4/2013 | Ortiz | ...................... G06Q 30/02 375/295 |

(Continued)

FOREIGN PATENT DOCUMENTS

| | | |
|---|---|---|
| JP | 2002-024458 A | 1/2002 |
| JP | 2002-342557 A | 11/2002 |

(Continued)

*Primary Examiner* — Mohamed A. Wasel
(74) *Attorney, Agent, or Firm* — Maier & Maier, PLLC

(57) ABSTRACT

A user can confirm the congestion degree of a congestion confirmation area at the present moment by a congestion confirmation system which includes mobile communication devices and a congestion confirmation server. The mobile communication device periodically detects and transmits the current location information to the congestion confirmation server. Receiving the current location information, the congestion confirmation server stores the current location information in a database in association with a current time. The mobile communication device sends a congestion confirmation request designating one of the congestion confirmation areas. In response to this request, the congestion confirmation server refers to the database and transmits the location information of mobile communication devices currently located in the congestion confirmation area as designated. Receiving the location information of the mobile communication devices, the mobile communication device which has sent the congestion confirmation request displays a map including the mobile communication devices.

3 Claims, 8 Drawing Sheets

(51) Int. Cl.
*H04W 4/029* (2018.01)
*G06V 20/00* (2022.01)

(56) References Cited

U.S. PATENT DOCUMENTS

| | | | | |
|---|---|---|---|---|
| 2014/0191872 | A1* | 7/2014 | Gomi | G06F 21/6254 340/573.1 |
| 2015/0177006 | A1* | 6/2015 | Schulz | H04W 4/024 701/537 |
| 2015/0373482 | A1* | 12/2015 | Barnard | H04W 4/024 370/338 |
| 2016/0253740 | A1* | 9/2016 | Goulart | G06Q 90/20 705/26.8 |
| 2016/0267330 | A1* | 9/2016 | Oami | G06T 7/20 |
| 2018/0103343 | A1* | 4/2018 | Vangipuram | H04W 4/021 |
| 2019/0230320 | A1* | 7/2019 | Moriya | H04N 7/18 |
| 2020/0153648 | A1* | 5/2020 | Ihara | H04W 4/021 |

FOREIGN PATENT DOCUMENTS

| | | |
|---|---|---|
| JP | 2010-283439 A | 12/2010 |
| JP | 2018-173985 A | 11/2018 |

\* cited by examiner

Fig. 2

| Area No. | Latitude | Longitude |
|---|---|---|
| ⋮ | ⋮ | ⋮ |
| 3829 | 35.681227 | 139.059279 |
| 3830 | 35.683701 | 139.793848 |
| ⋮ | ⋮ | ⋮ |

Fig. 4

Area No. 3829

| Time | User ID | Latitude | Longitude |
|---|---|---|---|
| ⋮ | ⋮ | ⋮ | ⋮ |
| 202002281450 | 00023873 | 35.681226 | 139.059277 |
| 202002281451 | 00014239 | 35.681220 | 139.059280 |
| ⋮ | ⋮ | ⋮ | ⋮ |

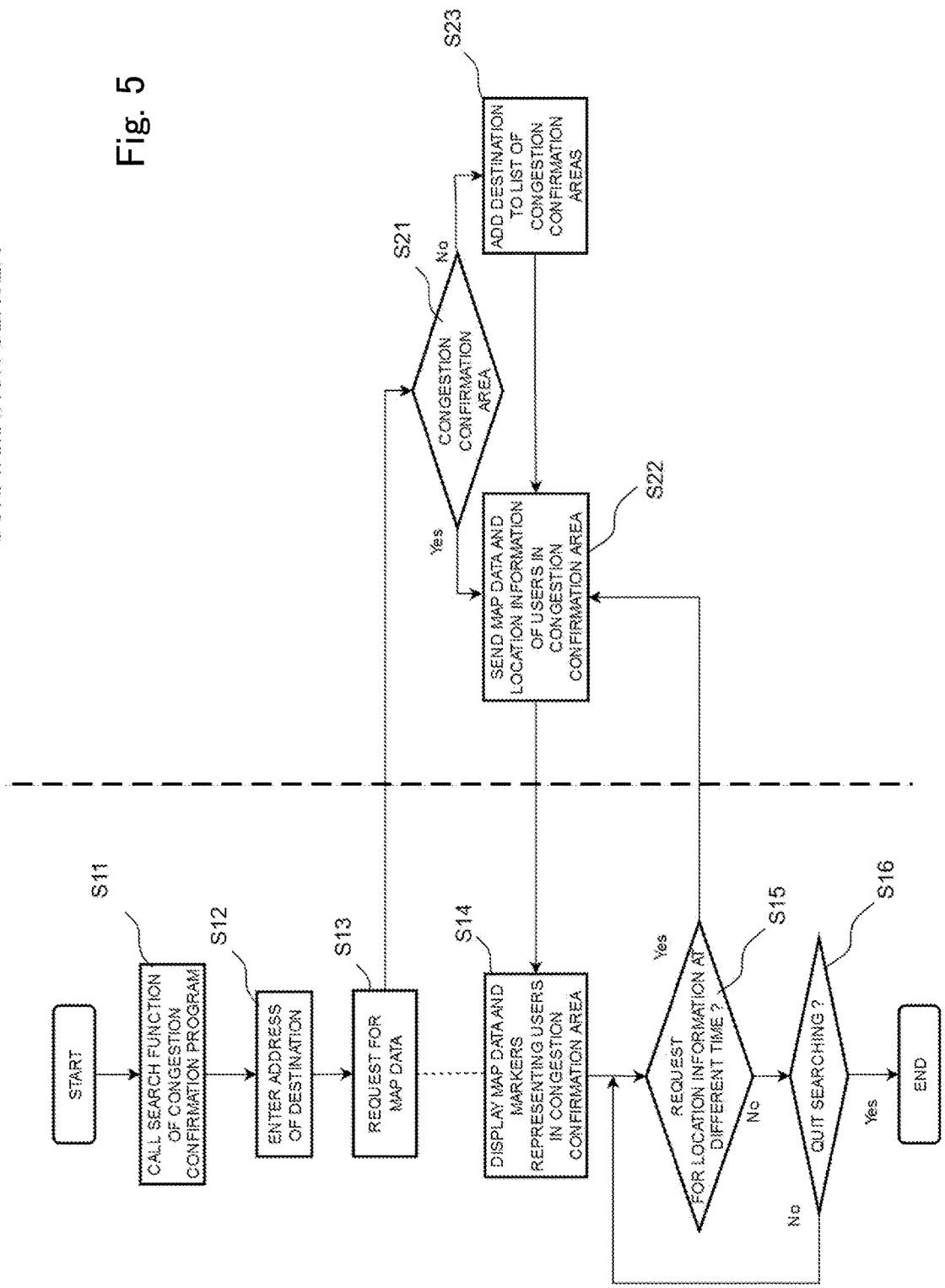

CONGESTION CONFIRMATION SYSTEM WITH LOCATION INFORMATION OF EACH USER

CROSS-REFERENCE TO RELATED APPLICATIONS

The present application claims priority under 35 U.S.C. § 119 to Japanese Patent Application No. 2020-059239, filed on Mar. 29, 2020 including description, claims, drawings, and abstract. The contents of this application are herein incorporated by reference in their entirety.

BACKGROUND

The present invention relates to a congestion confirmation system which makes it possible for a user to confirm the congestion degree of a resort area or the like at the present moment.

When going on a pleasure trip in the suburbs, mountain village or the like, we sometimes are baffled because of congestion. On occasion, we might have to return after giving up parking. While there are some theme parks or the like establishments distribute the congestion degree information on the Internet, such establishments are not typical so that the congestion can generally not be known before we go to the place.

As disclosed in Japanese Patent Published Application No. 2018-173985, a technique for estimating congestion degrees is proposed to calculate the current congestion degree by analyzing a video image taken with a monitoring camera on the street and calculating the current congestion degree from the number of persons and the area of the load.

However, even with such a technique, it is impossible to estimate the congestion degree when no monitoring camera is available.

Taking into consideration the above circumstances, it is an object of the present invention therefore to provide a congestion confirmation system which makes it possible to confirm the congestion degree of any congestion confirmation area at the present moment.

SUMMARY

To achieve at least one of the above-mentioned objects, reflecting one aspect of the present invention, a congestion confirmation system comprises: mobile communication devices each of which is provided with a communication capability of accessing the Internet and a detection capability of detecting current location information; and a congestion confirmation server connected to the Internet and provided with a list of a plurality of congestion confirmation areas in which congestion is to be confirmed are stored and a database in which the current location information of the communication devices is stored, wherein the mobile communication device periodically detects the current location information, and transmits the current location information to the congestion confirmation server when the mobile communication device is located in one of the congestion confirmation areas, wherein receiving the current location information from the mobile communication device, the congestion confirmation server stores the current location information in the database in association with a current time, wherein the mobile communication device sends a congestion confirmation request designating one of the congestion confirmation areas, wherein in response to the congestion confirmation request designating one of the congestion confirmation areas, the congestion confirmation server refers to the database and transmits the location information of mobile communication devices currently located in the congestion confirmation area designated by the congestion confirmation request, and wherein receiving the location information of the mobile communication devices in the designated congestion confirmation area, the mobile communication device which has sent the congestion confirmation request displays a map of the designated congestion confirmation area, and indicates the locations of the mobile communication devices in the map on the basis of the location information as received.

In accordance with one embodiment of the congestion confirmation system of the present invention, it is preferred that the mobile communication device sends a congestion confirmation request designating one of the congestion confirmation areas and a specific time, wherein in response to the congestion confirmation request designating one of the congestion confirmation areas and the specific time, the congestion confirmation server refers to the database and transmits the location information of mobile communication devices located in the congestion confirmation area designated by the congestion confirmation request at the specific time, and wherein receiving the location information of the mobile communication devices in the designated congestion confirmation area at the specific time, the mobile communication device which has sent the congestion confirmation request displays a map of the designated congestion confirmation area, and indicates the locations of the mobile communication devices in the map on the basis of the location information as received.

Furthermore, in accordance with one embodiment of the congestion confirmation system of the present invention, it is preferred that, while the locations of the mobile communication devices at a specific time are indicated in the map of the designated congestion confirmation area, the mobile communication device accepts a frame advance request or a frame return request from the user, and transmits the request to the congestion confirmation server together with the information indicative of the designated congestion confirmation area, wherein, in response to the frame advance request, the congestion confirmation server refers to the database and transmits the location information of mobile communication devices located in the designated congestion confirmation area a predetermined time period after the specific time to the mobile communication device which has sent the frame advance request, wherein receiving the location information a predetermined time period after the specific time, the mobile communication device which has sent the frame advance request indicates, in the map, the locations of the mobile communication devices a predetermined time period after the specific time, wherein, in response to the frame return request, the congestion confirmation server refers to the database and transmits the location information of mobile communication devices located in the designated congestion confirmation area a predetermined time period before the specific time to the mobile communication device which has sent the frame return request, and wherein receiving the location information a predetermined time period before the specific time, the mobile communication device which has sent the frame return request indicates, in the map, the locations of the mobile communication devices a predetermined time period before the specific time.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention.

FIG. 2 is a schematic diagram for showing a list of congestion confirmation areas stored in a congestion confirmation server in accordance with the embodiment 1 of the present invention.

FIG. 4 is a schematic diagram for showing the current location table provided in the congestion confirmation server in accordance with the embodiment 1 of the present invention.

FIG. 5 is a flow chart for showing the process that a user confirms the congestion degree of a destination with a smartphone in accordance with the embodiment 1 of the present invention.

DETAILED DESCRIPTION

In what follows, congestion confirmation systems in accordance with embodiments of the present invention will be explained with reference to the accompanying drawings. This congestion confirmation system includes a congestion confirmation server connected to the Internet, and mobile communication devices which receive a congestion confirmation service by communicating with this congestion confirmation server.

It is assumed that the mobile communication devices used in this system are capable of acquiring a current location information and provided with communication capability to connect to the Internet. Specifically, the mobile communication devices include multifunctional telephone terminals called smartphones, tablet type computers and the like. The method of acquiring a current location includes GPS (Global Positioning System) and cell phone tower triangulation and so forth.

Embodiment 1

Figure 1:
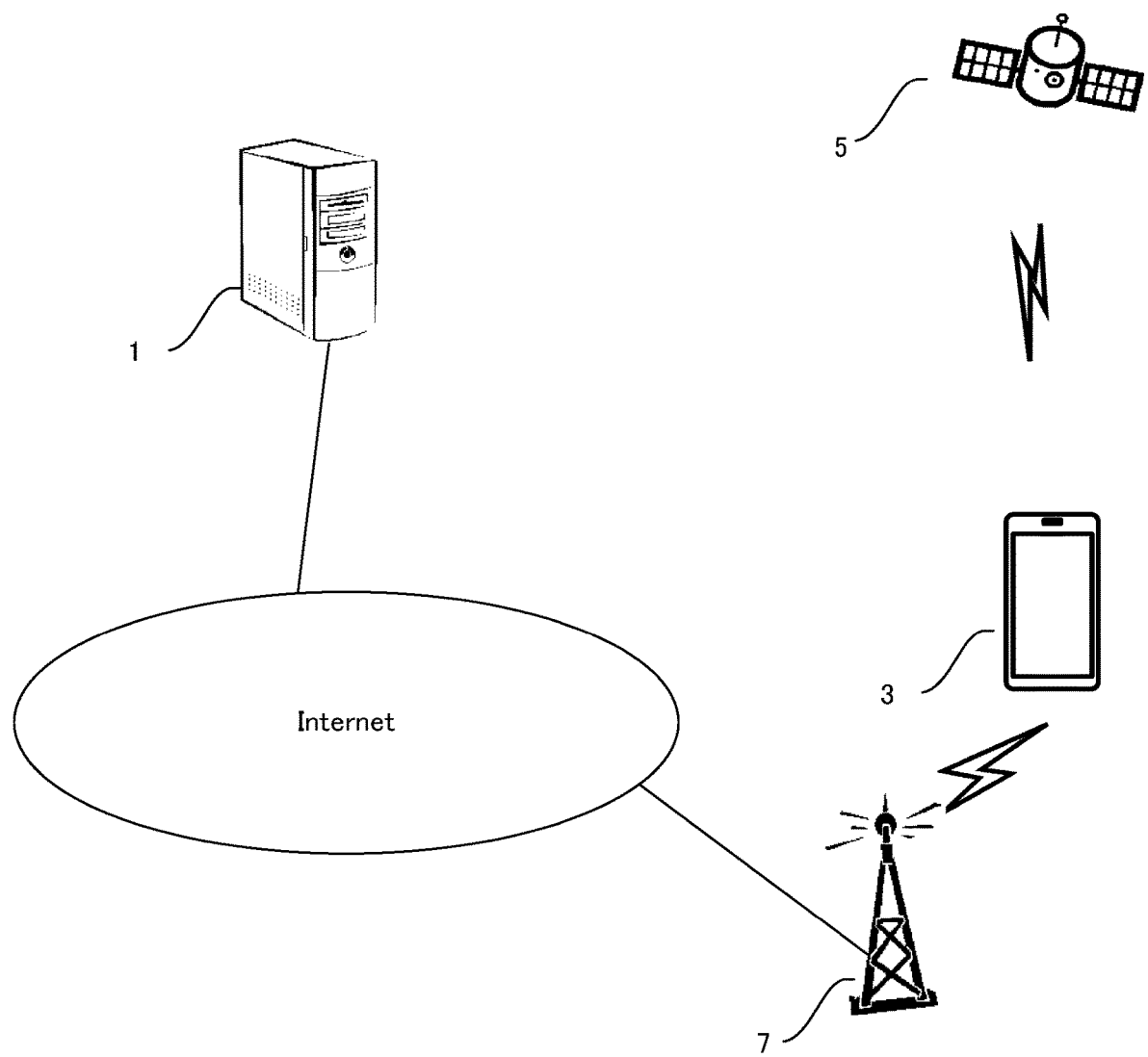
FIG. 1 is a schematic diagram for showing the overall configuration of the congestion confirmation system in accordance with an embodiment 1 of the present invention.

FIG. 1 is a schematic diagram for showing the overall configuration of the congestion confirmation system in accordance with an embodiment 1 of the present invention. This system includes a server program installed in a congestion confirmation server connected to the Internet, and a congestion confirmation program installed in a mobile communication device 3, which is typically a smartphone carried by a user.

A list of congestion confirmation areas is stored in the congestion confirmation server 1. This congestion confirmation area is an area in which a congestion degree is to be confirmed. Specifically, each set of latitude and longitude is assigned to one congestion confirmation area and stored in the congestion confirmation area list (refer to FIG. 2). In the actual implementation, for example, the congestion confirmation area is within the inner area of a circle having a certain radius centering at the corresponding latitude and longitude stored in the congestion confirmation area list. This certain radius is determined in correspondence with the area in which it is desired to confirm congestion, for example, 3 km or the like. If this congestion confirmation area is set to be larger, for example, a circle having a radius of 10 km, it is possible to confirm a user who is about to go to the destination.

Figure 3:
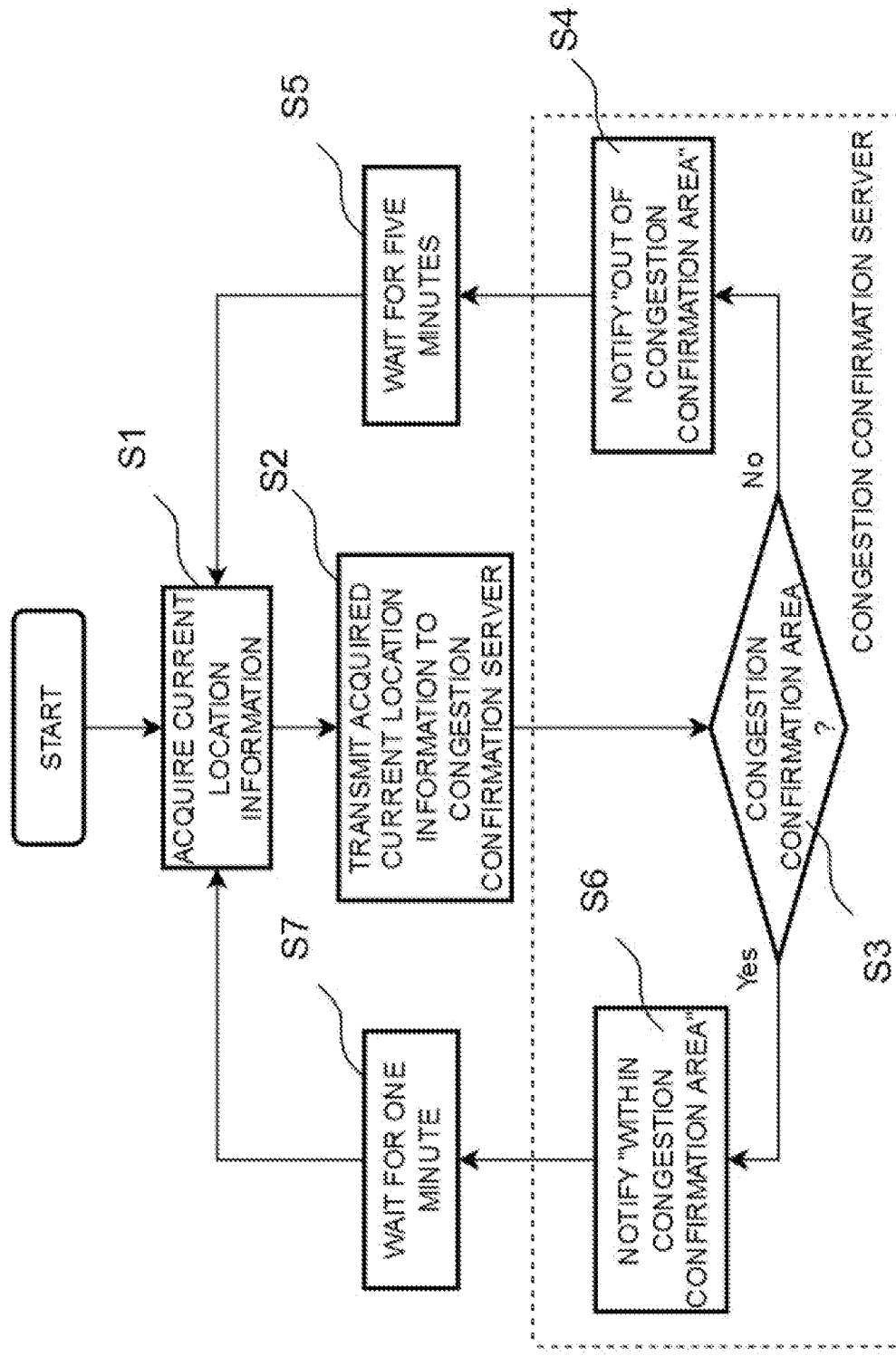
FIG. 3 is a flow chart for showing the process of the congestion confirmation program installed in the mobile communication device to periodically acquire the current location information by GPS using satellites 5, and transmit the acquired current location information to the congestion confirmation server 1.

FIG. 3 is a flow chart for showing the process of the congestion confirmation program installed in the mobile communication device to periodically acquire the current location information by GPS using satellites 5, and transmit the acquired current location information to the congestion confirmation server 1.

Namely, in step S1, the congestion confirmation program acquires the current location information by GPS or a base station 7. In step S2, the acquired current location information is transmitted to the congestion confirmation server 1. Receiving this current location information, the congestion confirmation server 1 confirms whether or not the current location is included in a congestion confirmation area of the congestion confirmation list in step S3, and the confirmation result is notified to the congestion confirmation program of the smartphone.

If the current location is not included in any congestion confirmation area (No in step S3), the congestion confirmation server 1 notifies the congestion confirmation program of the smartphone that the current location is not within any congestion confirmation area in step S4. The congestion confirmation program of the smartphone then waits for five minutes (step S5), acquires the current location information again (step S1), and transmit the current location information to the congestion confirmation server 1 (step S2). Namely, outside the congestion confirmation areas, the congestion confirmation program acquires and transmits the current location information every five minutes.

If the current location is included in a congestion confirmation area (Yes in step S3), the congestion confirmation server 1 notifies the congestion confirmation program of the smartphone that the current location is within a congestion confirmation area in step S6. The congestion confirmation program of the smartphone then waits for one minute (step S7), acquires the current location information again (step S1), and transmit the current location information to the congestion confirmation server 1 (step S2). Namely, within a congestion confirmation area, the congestion confirmation program repeats acquisition and transmission of the current location information at shorter time intervals, for example, every one minute in this case. Incidentally, when the congestion confirmation program transmits the current location information every one minute, a user ID identifying the user is transmitted at the same time.

As apparent from the flow chart shown in FIG. 3 as explained above, when the smartphone enters a congestion confirmation area, the current location information is acquired every one minute, and transmitted to the congestion confirmation server 1 together with the user ID. On the other hand, when the smartphone exits a congestion confirmation area, the transmission of the user ID is halted, and the current location information is acquired every five minutes, and transmitted to the congestion confirmation server 1.

The congestion confirmation server 1 registers the current location information (latitude and longitude) which is received in a database.

In this database, one current location table is provided for each congestion confirmation area. FIG. 4 is a schematic diagram for showing the current location table provided in the congestion confirmation server 1. Namely, each congestion confirmation area is provided with a current location table containing records each of which consists of a field for storing a time, a field for storing a user ID, a field for storing a latitude and a field for storing a longitude.

Receiving this current location information from the congestion confirmation program of the smartphone, the congestion confirmation server 1 stores the current time, user ID, latitude and longitude in a record of the current location table of the congestion confirmation area corresponding to the latitude and longitude. It is thereby possible to identify a user located in the congestion confirmation area at the present time (or specified time).

For example, users located in a certain congestion confirmation area at the present time can be identified by referring to the current location table corresponding to this congestion confirmation area, and acquiring the location information (latitude and longitude) during a period of one minute and thirty seconds back from the present time. Then, redundant information corresponding to the same user location information is deleted from the location information as acquired, and the records corresponding to the remaining location information are obtained as the location information of the users located in the congestion confirmation area at the present time. In this case, the location information acquiring period is one minute and thirty seconds rather than one minute for the purpose of avoiding information leakage due to the communication condition.

Also, for example, users located in a certain congestion confirmation area at a designated time, e.g., 14:50, Feb. 28, 2020 can be identified by referring to the current location table corresponding to this congestion confirmation area, and acquiring the location information (latitude and longitude) during a period of one minute and thirty seconds back from 14:50, Feb. 28, 2020. Then, redundant information corresponding to the same user location information is deleted from the location information as acquired, and the records corresponding to the remaining location information are obtained as the location information of the users located in the congestion confirmation area at 14:50, Feb. 28, 2020.

Furthermore, for example, the number of users located in a certain congestion confirmation area on a designated day, e.g., Feb. 28, 2020 can be identified by referring to the current location table corresponding to this congestion confirmation area, and acquiring the location information (latitude and longitude) during a period between 00:00, Feb. 28, 2020 and 23:59, Feb. 28, 2020. Then, redundant information corresponding to the same user location information is deleted from the location information as acquired, and the records corresponding to the remaining location information are obtained as the number of users located in the congestion confirmation area on Feb. 28, 2020.

In the same manner, for example, the total number of users located in a certain congestion confirmation area during the designated period, e.g., Feb. 1, 2020 through Feb. 28, 2020 can be calculated by calculating the number of users located in the congestion confirmation area on each day of the designated period as explained above and summing up the calculated numbers.

FIG. 5 is a flow chart for showing the process that a user confirms the congestion degree of a destination with a smartphone. Namely, first, the user calls a search function of the congestion confirmation program in step S11, and enters the address of the destination in step S12. Alternatively, the destination can be designated by displaying a map and accepting tapping operation on the destination of the map. The congestion confirmation program then sends a request to the congestion confirmation server 1 for transmitting map data of the destination in step S13.

Receiving the transmission request, the congestion confirmation program confirms whether or not the destination is included in the list of congestion confirmation areas in step S21. If the destination is included in the list of congestion confirmation areas (Yes in step S21), the congestion confirmation program returns, to the congestion confirmation program of the smartphone transmitting the transmission request, the map data of the destination together with the location information of users located in the congestion confirmation area corresponding to the destination in step S22.

Figure 6:
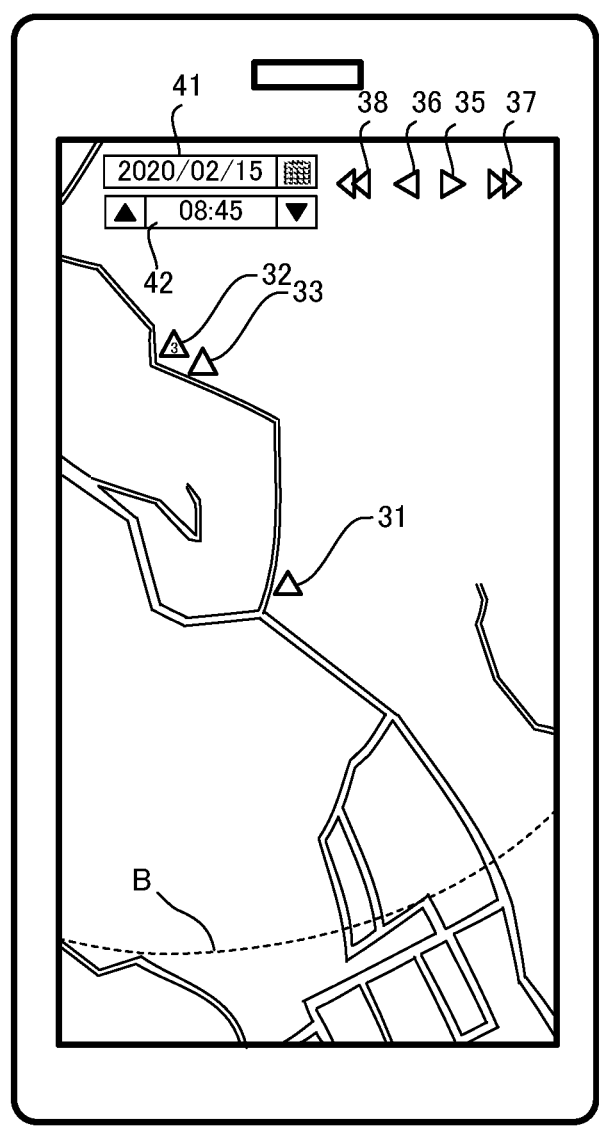
FIG. 6 is a schematic diagram for showing the screen of the smartphone in which is displayed the map data of the destination together with the location information of users currently located in the designated congestion confirmation area in accordance with the embodiment 1 of the present invention.

Receiving the map data of the destination together with the location information of users located in the congestion confirmation area corresponding to the destination, as illustrated in FIG. 6, the congestion confirmation program of the smartphone displays the map data on the screen of the smartphone in step S14. The current location of each user located in the congestion confirmation area is indicated by triangular marker 31, 32 or 33 so that the degree of the congestion can be known at a glance. This map as displayed can be freely zoomed in or out, moved and the like by operation such as pinch-in, pinch-out, dragging and the like.

Meanwhile, in the example shown in FIG. 6, the users located in the congestion confirmation area are plotted with the triangular markers 31, 32 and 33 in the figure. One marker usually indicates one user (smartphone). However, in the case where a plurality of users are located close together or overlapped, a numeral is displayed in one marker to indicate the number of users at the location of this marker. The triangular marker 32, in which numeral 3 is displayed, represents three users located in this location. Also, broken line B is drawn to indicate the boundary of the congestion confirmation area. No marker is displayed outside (downward in the case of the figure) of this broken line B.

The screen of the smartphone further includes a frame advance button 35 (triangle facing right), a frame return button 36 (triangle facing left), a fast forward button 37 (twofold triangle facing right) and a fast return button 38 (twofold triangle facing left).

Figure 7:
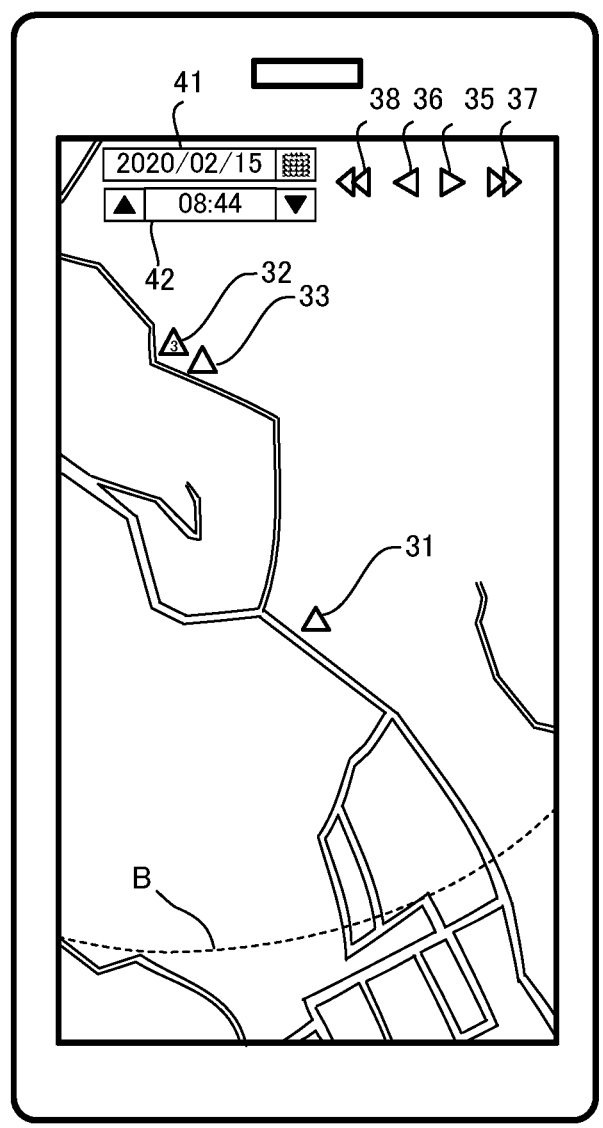
FIG. 7 is a schematic diagram for showing the screen of the smartphone in which is displayed the map data of the destination together with the location information of users located in the designated congestion confirmation area one minute before the currently displayed time as illustrated in FIG. 6 in accordance with the embodiment 1 of the present invention.

When the frame return button 36 is tapped, the smartphone sends a request to the congestion confirmation server 1 for the locations of the markers in the congestion confirmation area one minute before the currently displayed time, i.e., the time set to the map currently being displayed (Yes in step S15). Receiving the transmission request, the congestion confirmation server 1 transmits the locations of the markers one minute before to the smartphone which then displays the situation of one minute before as illustrated in FIG. 7. As compared with the situation shown in FIG. 6, it is understood that the user corresponding to marker 31 moves toward the destination from the situation of one minute before as illustrated in FIG. 7. It is possible to further return to two minutes before, three minutes before, . . . by repeating tapping the frame return button 36. Incidentally, this step of one minute corresponds to the cycle of transmitting the current location information to the congestion confirmation server 1 from the smartphone in a congestion confirmation area.

The frame advance button 35 has an opposite function to the frame return button 36. Namely, it is possible to display the situation one minute after the currently displayed time by tapping the frame advance button 35. Accordingly, if the currently displayed time is the current time (just now), the situation one minute after the currently displayed time does not arrive yet so that the frame advance button 35 is inoperative and therefore not displayed. However, when one minute elapses thereafter, the situation one minute after the currently displayed time becomes the latest situation so that the frame advance button 35 becomes operative and displayed.

When the fast return button 38 is tapped, the smartphone sends a request to the congestion confirmation server 1 for the locations of the markers in the congestion confirmation area ten minutes before the currently displayed time (Yes in step S15). Receiving the transmission request, the congestion confirmation server 1 transmits the locations of the markers of ten minutes before to the smartphone which then displays the situation of ten minutes before. It is possible to further return to twenty minutes before, thirty minutes before, forty minutes before, . . . by repeating tapping the fast return button 38.

Likewise, when the fast forward button 37 is tapped, the smartphone sends a request to the congestion confirmation server 1 for the locations of the markers in the congestion confirmation area ten minutes after the currently displayed time. Receiving the transmission request, the congestion confirmation server 1 transmits the locations of the markers ten minutes after to the smartphone which then displays the situation of ten minutes after. It is possible to further move forward through time twenty minutes after, thirty minutes after, forty minutes after the currently displayed time, . . . by repeating tapping the fast forward button 37 as long as the time is not forwarded beyond the current time.

Furthermore, there are provided a date input control 41 and a time input control 42 at the left upper corner of the screen of the smartphone. When date and time are input to these controls, the smartphone sends a request to the congestion confirmation server 1 for the locations of markers in the congestion confirmation area at the date and time as input. In response to the request, the congestion confirmation server 1 transmits the locations of markers corresponding to the input date and time, and the congestion situation at the input date and time is displayed on the screen of the smartphone.

If the destination does not exist in the list of congestion confirmation areas (No in step S21), the congestion confirmation server 1 adds the destination to the list of congestion confirmation areas in step S23. The congestion confirmation server 1 then transmits map data of the destination to the smartphone in step S22. At this time, no marker indicative of a user located in the congestion confirmation area is displayed in the map. However, after one minute, since the current location information is transmitted from users located in the congestion confirmation area, the users are plotted with markers in the map by tapping the frame advance button 35. The display of the screen is terminated after the use of the search function of the congestion confirmation program is finished (Yes in step S16), but the congestion confirmation program continues to repeat acquisition and transmission of the current location information in the background.

Embodiment 2

This embodiment makes use of a drone for the purpose of complementing the function of the congestion confirmation service. For example, when a user goes to a fishing spot of a mountain village by car, the user carries a drone, and flies the drone near the destination. The drone is implemented with a GPS so that it can autonomously fly to the destination.

Figure 8:
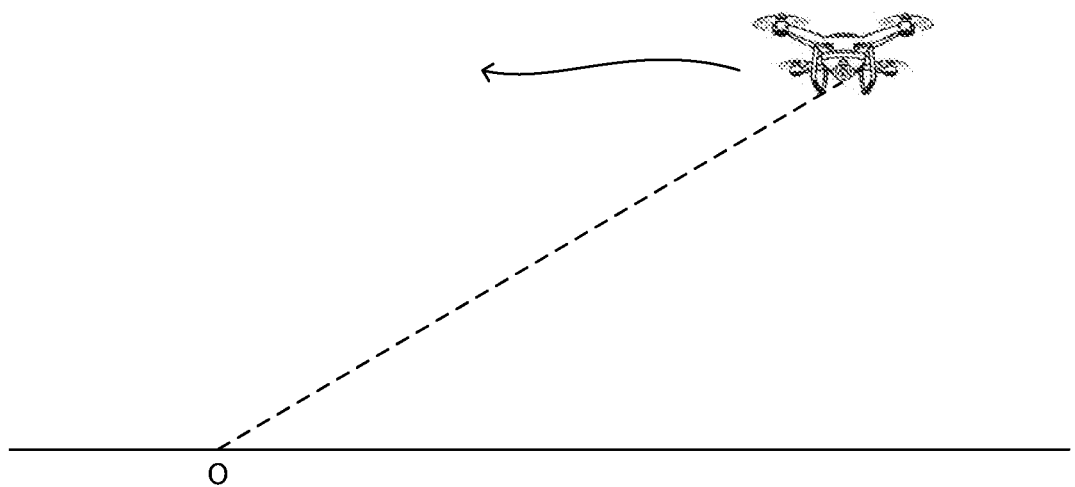
FIG. 8 is a schematic diagram for showing a drone which takes images of a congestion confirmation area in accordance with an embodiment 2 of the present invention.

When the drone arrives at the vicinity of the destination, the drone takes images of the destination O from the sky (refer to FIG. 8). For example, in the case where images are taken at an altitude of 100 m, image taking is started from 200 m ahead of the destination O, and continued while approaching 100 m from the destination O. The imaging data is transmitted from the drone to the smartphone by wifi together with the current location, altitude and imaging direction of the drone, and then transmitted from the smartphone to the congestion confirmation server 1 via the base station.

Receiving the imaging data together with the current location, altitude and imaging direction of the drone, the congestion confirmation server 1 identifies the place whose image is being taken on the basis of the current location, altitude and imaging direction of the drone. Furthermore, the imaging data is analyzed by an automatic image recognition system to recognize persons included in the imaging data and identify the locations thereof. The recognized persons are matched against the users included in the current location table of the congestion confirmation area corresponding to the place to find persons who are not included in the current location table. The found persons are considered as new users and recorded in the current location table. For example, in the case where five users are transmitting current location information from the congestion confirmation area while the persons recognized in the imaging data are six, it is revealed that there is one person who is not a user.

Figure 9:
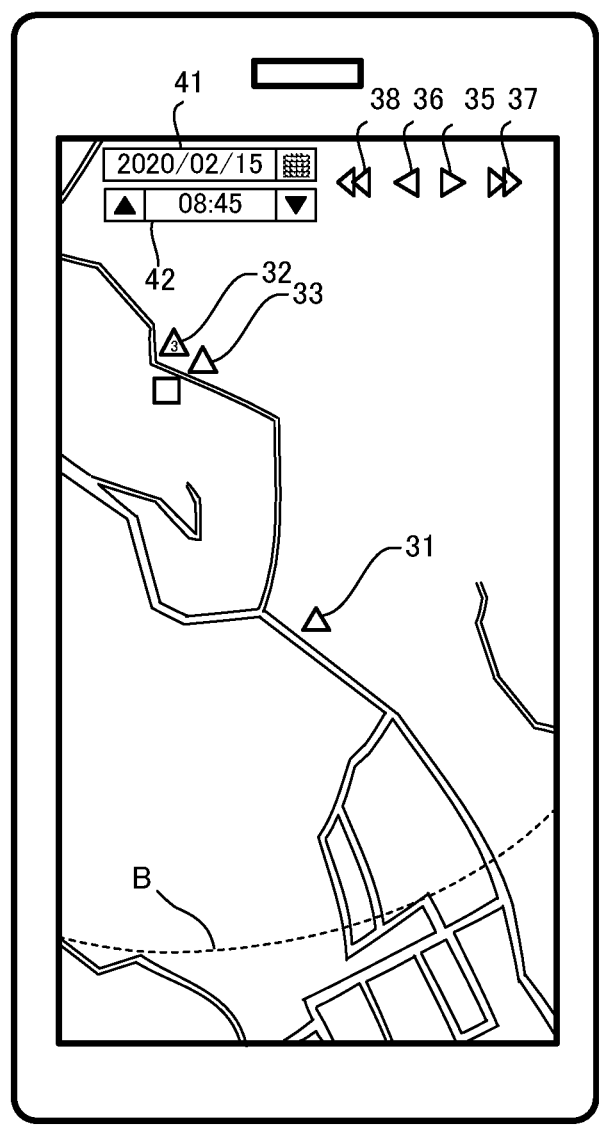
FIG. 9 is a schematic diagram for showing the screen of the smartphone in which is displayed the map data of the destination together with the location information of users located in the designated congestion confirmation area including a person who is not a user but is first found by image recognition of the images taken by the drone in accordance with the embodiment 2 of the present invention.

When a transmission request for map data of the destination is sent, a person who is not a user but is first found by the image recognition is represented by a square marker in the map data, which is returned in response to the request, for the purpose of distinguishing the person from usual users (refer to FIG. 9). By this configuration, it is possible to treat persons, who are not users of this system, by the congestion confirmation system to improve the accuracy of congestion confirmation.

As has been discussed above, in accordance with the congestion confirmation system of the present invention, it possible for a user to confirm the congestion degree of any congestion confirmation area at the present moment.

The foregoing description of the embodiments has been presented for purposes of illustration and description. It is not intended to be exhaustive or to limit the invention to the precise form described, and obviously many modifications and variations are possible in light of the above teaching.

The embodiment was chosen in order to explain most clearly the principles of the invention and its practical application thereby to enable others in the art to utilize most effectively the invention in various embodiments and with various modifications as are suited to the particular use contemplated.

What is claimed is:

1. A congestion confirmation system comprising:

mobile communication devices each of which is provided with a communication capability of accessing the Internet and a detection capability of detecting current location information; and a congestion confirmation server connected to the Internet and provided with a list of a plurality of congestion confirmation areas in which congestion is to be confirmed are stored and a database in which the current location information of the communication devices is stored, wherein the mobile communication device periodically detects the current location information, and transmits the current location information to the congestion confirmation server when the mobile communication device is located in one of the congestion confirmation areas, wherein receiving the current location information from the mobile communication device, the congestion confirmation server stores the current location information in the database in association with a current time, wherein the mobile communication device sends a congestion confirmation request designating one of the congestion confirmation areas, wherein in response to the congestion confirmation request designating one of the congestion confirmation areas, the congestion confirmation server refers to the database and transmits the location information of mobile communication devices currently located in the congestion confirmation area designated by the congestion confirmation request, wherein receiving the location information of the mobile communication devices in the designated congestion confirmation area, the mobile communication device which has sent the congestion confirmation request displays a map of the designated congestion confirmation area, and wherein the map indicates the location of each of the mobile communication devices in the map on the basis of the location information as received, and wherein each of the mobile communication devices corresponds to a marker which is displayed in the map in order to indicate the current location of the each of the mobile communication devices respectively when the congestion confirmation request is sent.

2. The congestion confirmation system of claim 1 wherein the mobile communication device sends a congestion confirmation request designating one of the congestion confirmation areas and a specific time, wherein in response to the congestion confirmation request designating one of the congestion confirmation areas and the specific time, the congestion confirmation server refers to the database and transmits the location information of mobile communication devices located in the congestion confirmation area designated by the congestion confirmation request at the specific time, and wherein receiving the location information of the mobile communication devices in the designated congestion confirmation area at the specific time, the mobile communication device which has sent the congestion confirmation request displays a map of the designated congestion confirmation area, and indicates the locations of the mobile communication devices in the map on the basis of the location information as received.

3. The congestion confirmation system of claim 2 wherein, while the locations of the mobile communication devices at a specific time are indicated in the map of the designated congestion confirmation area, the mobile communication device accepts a frame advance request or a frame return request from the user, and transmits the request to the congestion confirmation server together with the information indicative of the designated congestion confirmation area, wherein, in response to the frame advance request, the congestion confirmation server refers to the database and transmits the location information of mobile communication devices located in the designated congestion confirmation area a predetermined time period after the specific time to the mobile communication device which has sent the frame advance request, wherein receiving the location information a predetermined time period after the specific time, the mobile communication device which has sent the frame advance request indicates, in the map, the locations of the mobile communication devices a predetermined time period after the specific time, wherein, in response to the frame return request, the congestion confirmation server refers to the database and transmits the location information of mobile communication devices located in the designated congestion confirmation area a predetermined time period before the specific time to the mobile communication device which has sent the frame return request, and wherein receiving the location information a predetermined time period before the specific time, the mobile communication device which has sent the frame return request indicates, in the map, the locations of the mobile communication devices a predetermined time period before the specific time.

* * * * *